United States Patent [19]
Leeds et al.

[11] Patent Number: 5,443,357
[45] Date of Patent: Aug. 22, 1995

[54] APPARATUS FOR FORMING A TYNE LAYER IN AN AUTOMATIC BRICK STACKING SYSTEM

[75] Inventors: Harry D. Leeds, Clarksville, Ark.; Thomas M. Fisher, Enka; Paula S. Fann, Asheville, both of N.C.

[73] Assignee: Artech, Clarksville, Ark.

[21] Appl. No.: 69,020

[22] Filed: May 28, 1993

[51] Int. Cl.⁶ ............................................. B65G 57/03
[52] U.S. Cl. ............................. 414/792.9; 414/789.8; 294/62; 198/430; 198/434
[58] Field of Search ............... 198/374, 430, 432, 434; 414/788, 788.1, 788.4, 789.8, 742.4, 798.2, 798.3, 798.9; 294/62, 87.1, 63.1, 63.2, 86.4

[56] References Cited
U.S. PATENT DOCUMENTS

| | | | |
|---|---|---|---|
| 2,076,204 | 4/1937 | Martin | 294/63.1 |
| 3,095,678 | 7/1963 | Cliff et al. | 414/789.8 |
| 3,270,897 | 9/1966 | Lingl | 414/792.9 |
| 3,729,084 | 4/1973 | Stuart et al. | 414/798.2 |
| 3,777,873 | 12/1973 | Stuart | 198/434 |
| 3,892,318 | 7/1975 | Berndt et al. | 414/788.4 |
| 4,182,442 | 1/1980 | Jones | 294/63.2 |
| 4,211,130 | 7/1980 | Buckner et al. | 414/788.1 |

Primary Examiner—F. J. Bartuska
Assistant Examiner—Gregory A. Morse
Attorney, Agent, or Firm—Rhodes, Coats & Bennett

[57] ABSTRACT

An apparatus for forming a tyne layer in an automatic brick stacking system having a conveyor for moving courses of brick from a kiln car to a stacking and strapping station is disclosed. The apparatus includes a set-down transfer head for removing a course of brick from the conveyor. A separation conveyor receives brick from the set-down transfer head. The separation conveyor has a plurality of parallel, spaced-apart conveying means for moving the bricks in a longitudinal direction. A stop means engages and stops the movement of bricks therepast. A lift means is disposed between the conveying means and between one end of the separation conveyor and the stop means for lifting and redepositing a portion of the bricks upstream of the stop means. The conveying means, stop means, and first lift means are sequentially operated in a cooperative relationship to space the rows of brick apart in the longitudinal direction of conveyance and at predetermined intervals to form the tyne layer. A tyne pick-up head removes the tyne layer from the separation conveyor and deposits it on the conveyor where it is moved to the stacking and straping station.

26 Claims, 6 Drawing Sheets

APPARATUS FOR FORMING A TYNE LAYER IN AN AUTOMATIC BRICK STACKING SYSTEM

BACKGROUND OF THE INVENTION

1. Field of the Invention

The present invention relates generally to the unloading and packaging of brick and, more particularly, to an apparatus for forming a tyne layer in an automatic brick stacking system.

2. Description of the Prior Art

After brick are fired in a kiln, the kiln cars carry the bricks in open stacks to an unstacking area where they are placed on some type of conveyor which carries the bricks to the stacking and strapping section. The brick are normally unloaded from the kiln car in double layer courses and regrouped to form a number of rows and number of brick in each row for the final package. One standard size package in the United States is 5 brick long, 11 brick wide and 10 brick high.

The tyne layer is a layer of brick that usually includes a pair of openings where 2 rows, each 2 brick wide, are removed to allow an opening for the tynes of a fork lift truck to be received in order that the entire stack of brick may be moved after it is completed and strapped. The tyne layer is conventionally the third layer from the bottom of the completed brick stack. Additional courses of brick are then added to the tyne layer to complete the package.

Some automatic equipment has been developed to form these tyne courses, such as illustrated in U.S. Pat. Nos. 3,491,901 and 3,392,851. Both of the apparatus shown in these patents, however, are useful only in operating on single layer rows of brick and are not adapted for use with double layer courses. Using double layer courses, economics may be realized since twice as many brick may be handled during the same time interval.

U.S. Pat. No. 3,731,785, issued to Stewart, discloses an apparatus in which double layer courses of bricks, with the bricks in one layer atop the bricks in the other layer, are marshalled along a conveyor between a kiln car unstacking apparatus and a brick stacking and strapping apparatus. A pick-up head is lowered to a position overlying selected courses and a first set of gripper members are activated to grip the entire upper layer while a second set of grippers, independently operated from the first set, is activated to grip selected bricks in the lower layer, selected brick being those necessary to form the tyne openings. The pick-up head is then moved upward vertically and horizontally to a second position where the selected brick from the second level are deposited on a tyne brick table. The pick-up head is then moved to a third position where the upper level of brick is returned to its initial position atop the lower level in the same selected course.

U.S. Pat. No. 3,992,049, issued to Milholen et al., discloses an apparatus in which bricks are continuously received in double-layer courses. The courses are shifted one at a time onto a receiving plate whereupon a gripper apparatus is activated to grip the opposite sides of the course and retain the course as the receiving plate is removed from beneath the course. A platform is elevated to engage or cause the bricks already deposited thereon to engage the lower surface of the course being held by the gripper apparatus whereupon the gripper apparatus is deactivated. The elevator lowers and the receiving plate is returned to its initial position. During selected course transfers a tyne tray apparatus cooperates with the gripper apparatus to form tyne openings in selected layers.

However, as can be seen, in both of these solutions, the selected brick removed to form the tyne openings must be discarded or somehow reincorporated back into the stacks. This normally requires a full-time operator to oversee the operation of the machine.

Thus, there remains a need for a new and improved apparatus for forming tyne layers in an automatic brick stacking system which utilizes all the brick in a course of bricks being used to form a tyne layer which, at the same time, does not require an operator to oversee the operation of the apparatus.

SUMMARY OF THE INVENTION

The present invention is directed to an apparatus for forming a tyne layer in an automatic brick stacking system having a conveyor for moving courses of brick from a kiln car to a stacking and straping station.

The apparatus includes a set-down transfer head for removing a course of brick from the conveyor. The transfer head includes an overhead frame; a first pair of opposed gripping heads attached to the frame, the heads having a first gripping surface located along the lower edge of each head; and a second pair of opposed gripping heads attached to the first pair of opposed gripping heads, the heads having a second gripping surface located along the lower edge of each head and parallel and adjacent to the first gripping surface.

A separation conveyor receives brick from the set-down transfer head. The separation conveyor has a plurality of parallel, spaced-apart conveying means for moving the bricks in a longitudinal direction. A stop means for engages and stops the movement of bricks therepast. A first lift means is disposed between the conveying means and between one end of the separation conveyor and the stop means for lifting and redepositing a portion of the bricks upstream of the stop means. The conveying means, stop means, and first lift means are sequentially operated in a cooperative relationship to space the rows of brick apart in the longitudinal direction of conveyance and at predetermined intervals to form the tyne layer.

A tyne pick-up head removes the tyne layer from the separation conveyor and deposits it on the conveyor where it is moved to the stacking and straping station.

The use of a separation conveyor in combination with the bonus set-down transfer pick-up head and the tyne pick-up head permits complete utilization of the brick being used to form the tyne course. In addition, the void size on any size of brick may be varied by the separation conveyor to leave out any desired number of brick including forming partial tyne openings. Finally, its completely automatic operation does not require operator intervention.

Accordingly, one aspect of the present invention is to provide an apparatus for forming a tyne layer in an automatic brick stacking system having a conveyor for moving courses of brick from a kiln car to a stacking and straping station. The apparatus includes: (a) a set-down transfer head for removing a course of brick from the conveyor; (b) a separation conveyor for receiving brick from the set-down transfer head and conveying the bricks, the separation conveyor having a plurality of parallel, spaced-apart conveying means for moving the bricks in a longitudinal direction; (c) stop means for engaging and stopping the movement of bricks therepast; and (d) a first lift means disposed between the conveying means and between one end of the separation conveyor and the stop means for lifting and redepositing a portion of the bricks upstream of the stop means, whereby the conveying means, stop means, and first lift means are sequentially operated in a cooperative relationship to space the rows of brick apart in the longitudinal direction of conveyance and at predetermined intervals to form the tyne layer.

Another aspect of the present invention is to provide an apparatus for removing at least two courses of brick and for selectively depositing one course or two courses of brick. The apparatus includes: (a) an overhead frame; (b) a first pair of opposed gripping heads attached to the frame, the heads having a first gripping surface located along the lower edge of each head; and (c) a second pair of opposed gripping heads attached to the first pair of opposed gripping heads, the heads having a second gripping surface located along the lower edge of each head and parallel and adjacent to the first gripping surface.

Still another aspect of the present invention is to provide an apparatus for forming a tyne layer in an automatic brick stacking system having a conveyor for moving courses of brick from a kiln car to a stacking and straping station. The apparatus includes: (a) a setdown transfer head for removing a course of brick from the conveyor, the transfer head including: (i) an overhead frame; (ii) a first pair of opposed gripping heads attached to the frame, the heads having a first gripping surface located along the lower edge of each head; and (iii) a second pair of opposed gripping heads attached to the first pair of opposed gripping heads, the heads having a second gripping surface located along the lower edge of each head and parallel and adjacent to the first gripping surface; (b) a separation conveyor for receiving brick from the set-down transfer head and conveying the bricks, the separation conveyor having a plurality of parallel, spaced-apart conveying means for moving the bricks in a longitudinal direction; (c) stop means for engaging and stopping the movement of bricks therepast; (d) a first lift means disposed between the conveying means and between one end of the separation conveyor and the stop means for lifting and redepositing a portion of the bricks upstream of the stop means, whereby the conveying means, stop means, and first lift means are sequentially operated in a cooperative relationship to space the rows of brick apart in the longitudinal direction of conveyance and at predetermined intervals to form the tyne layer; and (e) a tyne pick-up head for removing the tyne layer from the separation conveyor.

These and other aspects of the present invention will become apparent to those skilled in the art after a reading of the following description of the preferred embodiment when considered with the drawings.

BRIEF DESCRIPTION OF THE DRAWINGS

FIG. 4A-P illustrate the sequence of movement of bricks through the tyne building apparatus;

DESCRIPTION OF THE PREFERRED EMBODIMENTS

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
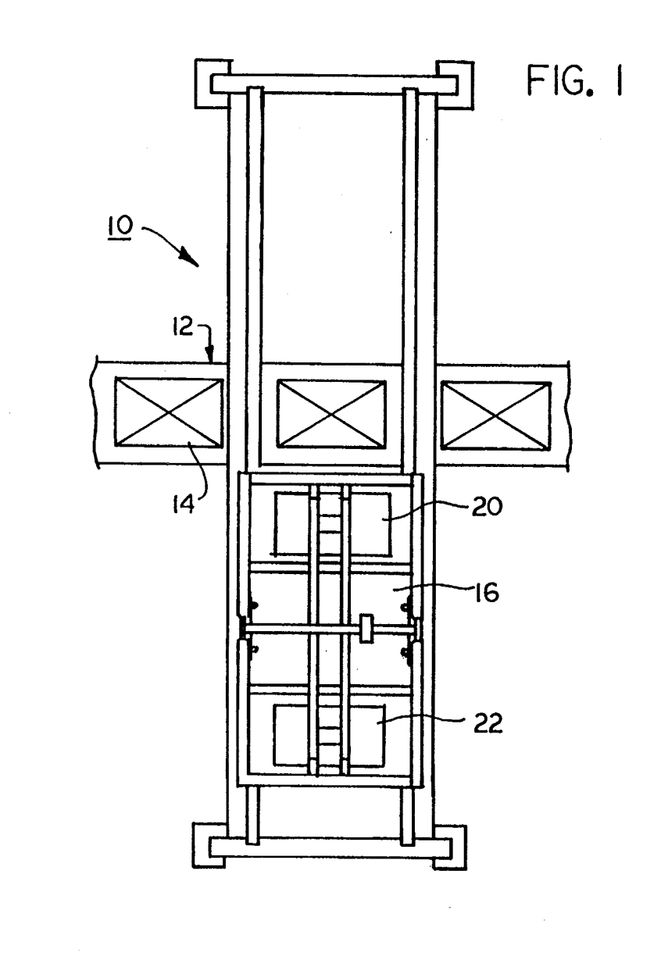
FIG. 1 is a plan view of a tyne building apparatus, constructed according to the present invention.

Referring now to the drawings in general, and FIG. 1 in particular, it will be understood that the illustrations are for the purpose of describing the preferred embodiment of the invention and are not intended to limit the invention thereto. As best seen in FIG. 1, a tyne building apparatus, generally designated 10, is shown constructed according to the present invention. The tyne building apparatus is transversely located with respect to a conveyor 12 for moving courses of brick 14 from kiln cars to a stacker and strapper (not shown). The tyne building apparatus 10 includes three major sub-assemblies: a separation conveyor 16; a bonus pick-up head 20; and a conventional tyne pick-up head 22, such as shown in U.S. Pat. No. 3,992,049.

The principal of operation of the separation conveyor 16 can best be understood by a review of U.S. Pat. No. 5,054,994, issued to Leeds et al. This patent is hereby incorporated by reference in its entirety.

Figure 2:
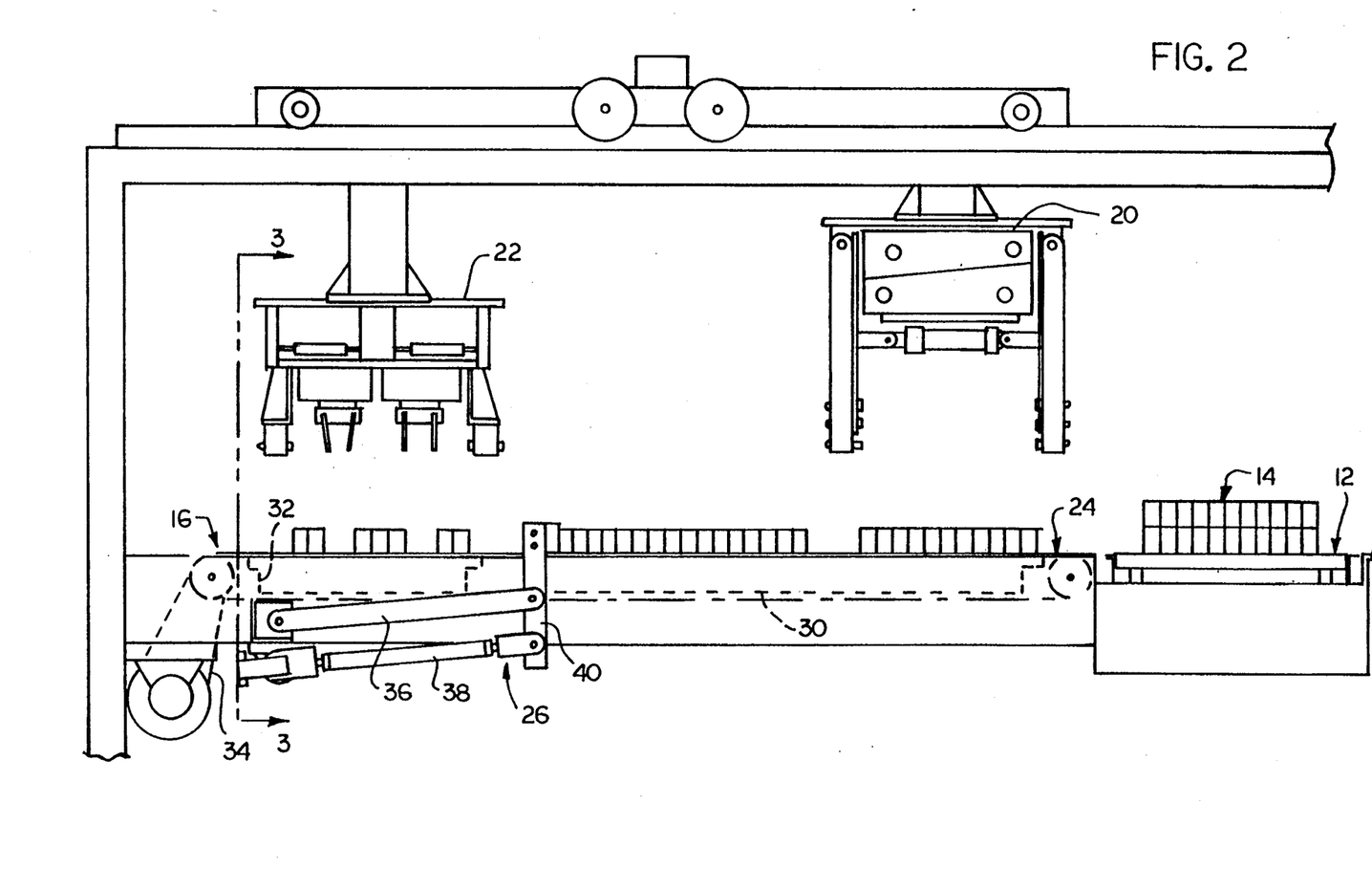
FIG. 2 is a side view of the tyne building apparatus shown in FIG. 1.

Turning now to FIG. 2, there is shown a side view of the tyne building apparatus shown in FIG. 1. Separation conveyor 16 includes a plurality of parallel belts or chains 24. A stop assembly 26 is located adjacent to the tyne head 22. The separation conveyor 16 includes a first grouping lift 30 and a second tyne lift 32. The separation conveyor is driven by a drive motor 34 equipped with an encoder to precisely control the movement of the belts. Stop assembly 26 includes two pair of parallel arms 36, 38 attached to a stop and frame 40. Air bag actuators 42 are located adjacent to arms 36, 38 to raise and lower the stop assembly. The parallel arm arrangement insures that the stop and frame 40 moves up and down parallel to the surface of the bricks stacked on the surface of separation conveyor 16.

In the preferred embodiment, the continuous belt conveyor 24 is a linked chain to prevent slippage and the drive means 34 is a servo-electric motor.

Figure 3:
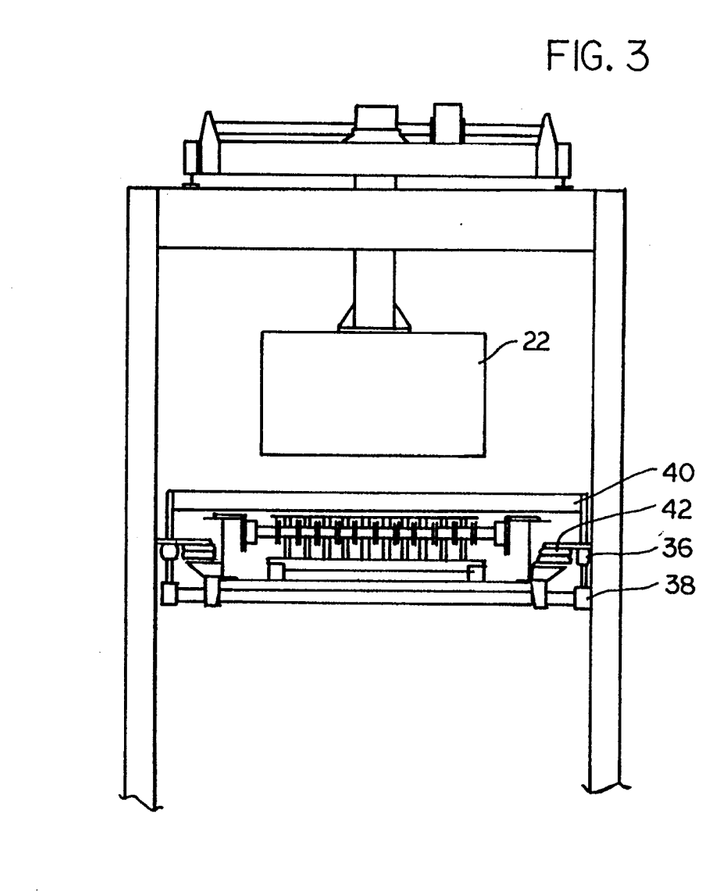
FIG. 3 is a cross-sectional view of the tyne building apparatus shown in FIG. 2, taken along lines 3—3.

FIG. 3 illustrates a cross-sectional view of the tyne building assembly shown in FIG. 2, taken along lines 3—3.

A conventional control means is connected to the separation conveyor, stop assembly, and first grouping lift whereby the conveyor assembly, stop assembly, and first grouping lift are sequentially operated in a cooperative relationship to space the rows of brick apart in the longitudinal direction of conveyance and at predetermined intervals as they are conveyed downstream to the second lift tyne. The separation conveyor assembly further includes an encoder connected to the conveyor drive motor for providing a electrical signal indicative of the position of the conveyor and a control circuit connected between the encoder means and the drive means for controlling the position of the conveyor means.

Figure 4A:
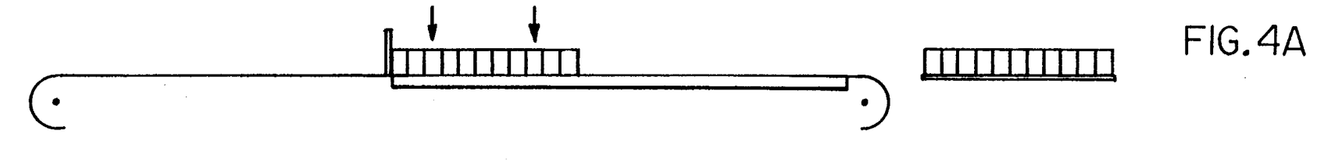
Figure 4B:
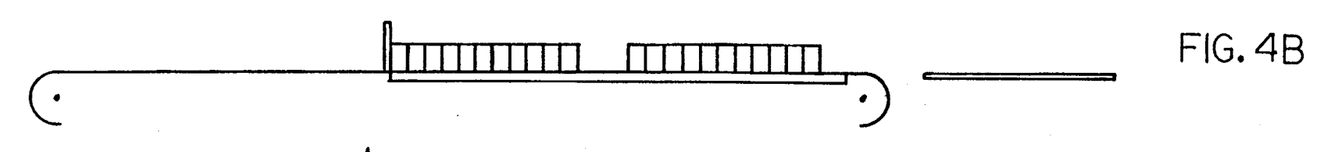
Figure 4C:
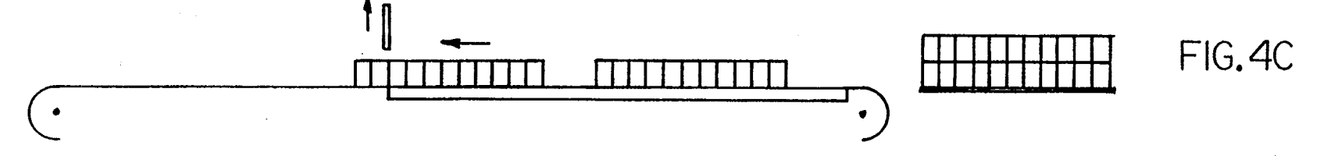
Figure 4D:
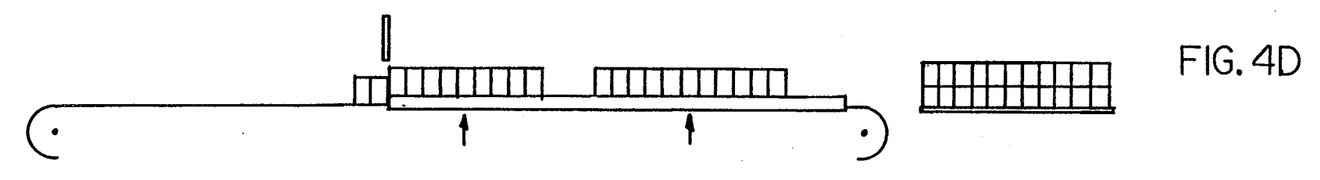
Figure 4E:
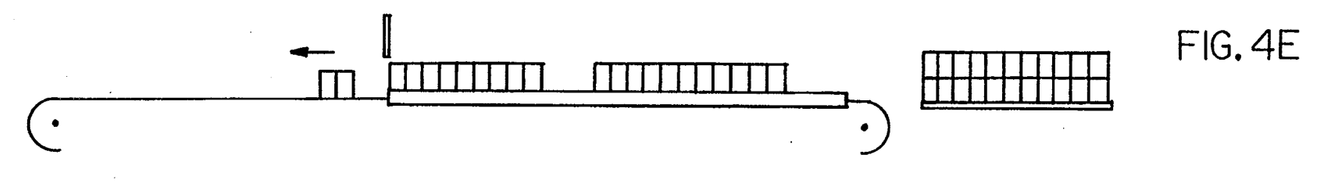
Figure 4F:
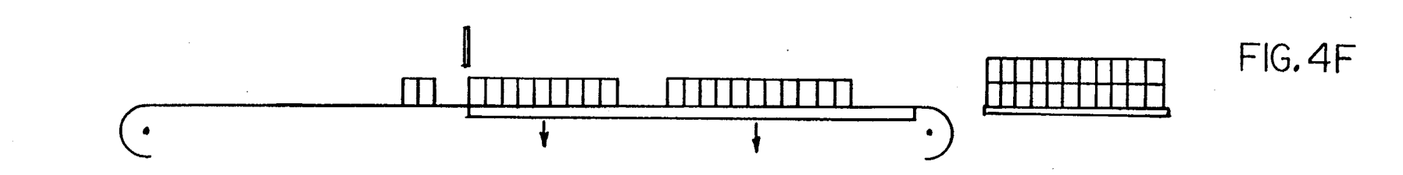
Figure 4G:
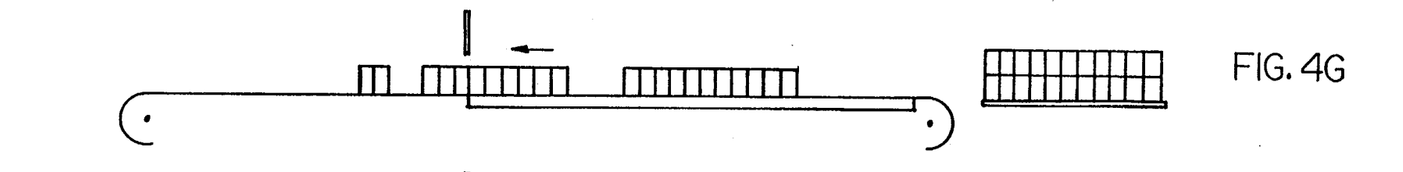
Figure 4H:
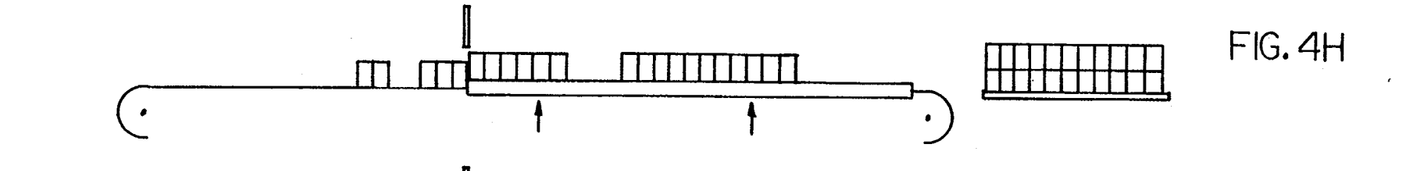
Figure 4I:
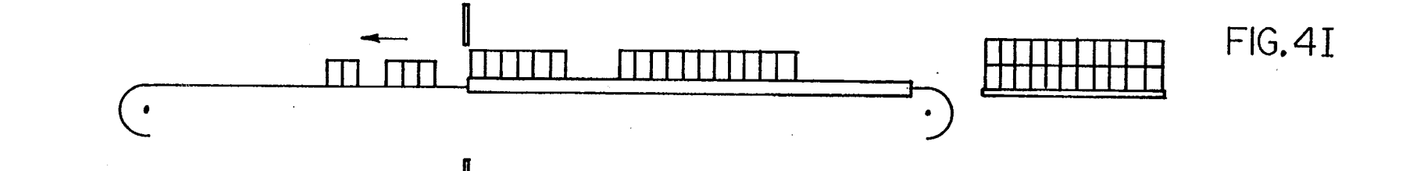
Figure 4J:
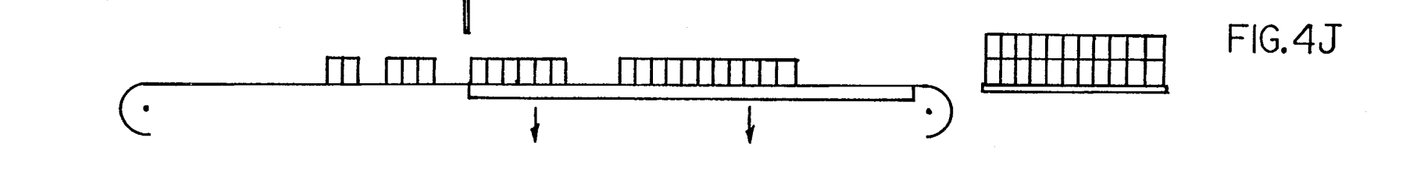
Figures 4K, 4L, 4M:
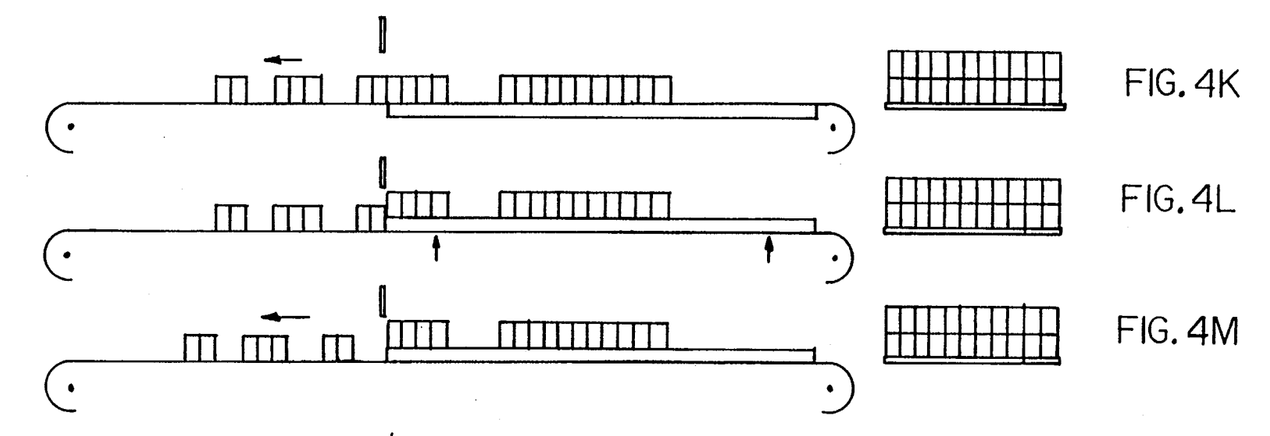
Figure 4N:
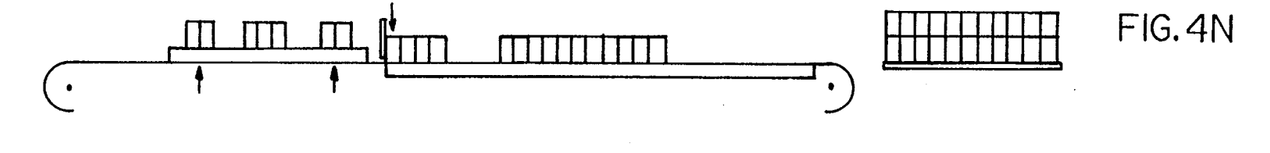
Figure 4O:
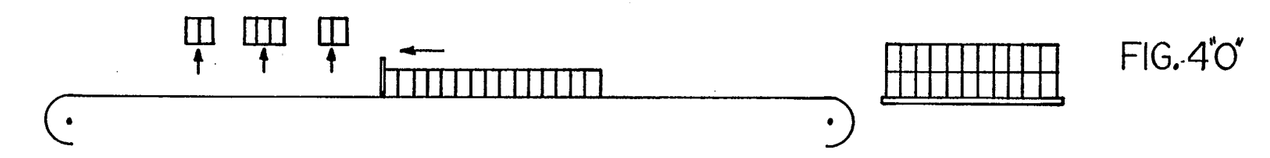

The operation of the tyne building apparatus can best be understood by a review of FIGS. 4A–4P which illustrates the sequence of movement of brick through the tyne building assembly. One layer of brick from a two course stack on conveyor 12 is set down on the separation conveyor 16, the grouping lift is dropped down, the stop assembly is lowered and the separation conveyor is indexed forward to group the brick against the stop assembly (4A). If there is room remaining on the separation conveyor 16, a second course of brick may be set down on the separation conveyor 16 (4B). The grouping lift is then lowered, the stop assembly is raised and the separation conveyor 16 is indexed forward two brick (4C). The grouping lift then raises all but the two furthermost brick off the surface of the separation conveyor (4D). The separation conveyor is then indexed forward to form a two brick wide tyne space (4E). At this point, the grouping lift is lowered and separation conveyor 16 is indexed three brick forward (4G). The grouping lift is then raised (FIG. 4H). The separation conveyor then is indexed two brick forward to form the second tyne space (4I). This step is similar to step 4E.

The grouping lift is then lowered (4J) like step 4F. The separation conveyor 16 is indexed two brick forward to form the last portion of the tyne course (4K) similar to step 4C. The grouping lift is then raised (4L) like step 4D. The separation conveyor 16 is then indexed forward to move the tyne course in position underneath the tyne head (4M). At this point, the grouping lift is lowered, the stop assembly is lowered, and the tyne lift raises the tyne course off the surface of separation conveyor 16 (4N). Next, the tyne course is raised by the tyne pick-up head 22 and the separation conveyor 16 is indexed forward to group the remaining brick together (4O). Finally, the tyne course is set on the two-course high stack of brick on conveyor 12 (4P).

Figure 4P:
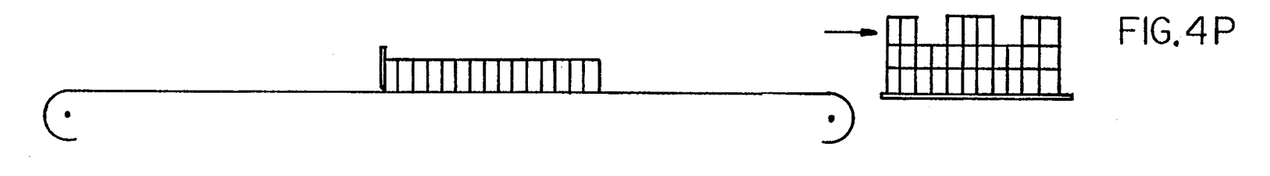

Steps 4A–4P are repeated to form additional tyne courses. Normally, the brick are formed into a first three-course high layer having an upper layer forming the tyne course, a second layer having two courses of brick, a third layer having two courses of brick and a fourth layer having three courses of brick. This grouping forms a package having ten layers of brick arranged in 5 rows each having 11 brick in each row. Allowing for the 20 brick removed to form the tyne openings, this arrangement forms a standard package size of 530 brick.

In another standard package, the brick are formed into a first three-course high layer having an upper layer forming the tyne course, a second layer having two courses of brick, a third layer having two courses of brick, a fourth layer having two courses of brick and a fifth layer having three courses of brick. This grouping forms a package having twelve layers of brick arranged in 5 rows each having 9 brick in each row. Allowing for the 20 brick removed to form the tyne openings, this arrangement forms a package size of 520 brick commonly called a Queen Size package.

As can be seen from FIG. 4A–4P, the use of a separation conveyor 16 in combination with bonus pick-up head 20 and the tyne pick-up head 22 permits complete utilization of the brick being used to form the tyne course. In addition, the void size on any size of brick may be varied by the separation conveyor to leave out any desired number of brick including forming partial tyne openings. Finally, its completely automatic operation does not require operator intervention.

Figure 5:
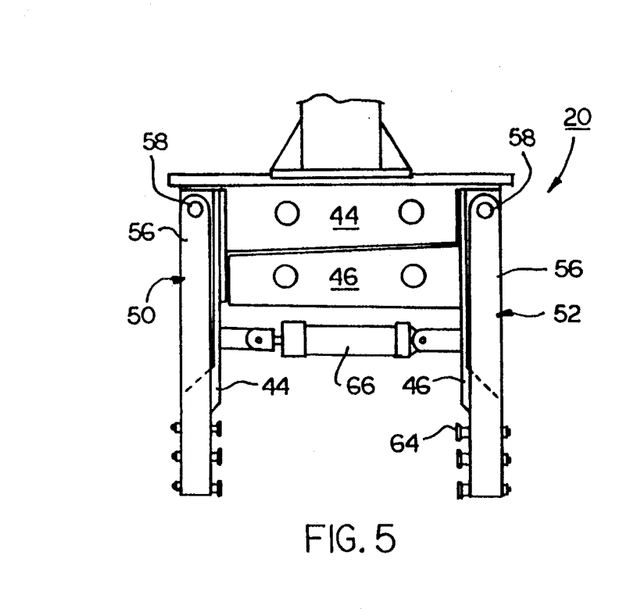
FIG. 5 is an enlarged end view of the bonus head assembly shown in FIG. 2 with the lower, outer grippers in their open position.

Turning now to FIG. 5, there is shown an enlarged end view of the bonus head assembly shown in FIG. 2 with the lower, outer grippers open. Bonus head assembly 20 is generally conventional in design, having a pair of inner, opposed grippers 44, 46. These are generally conventional in construction and operate by cam and cylinders operation to close the gripper heads together. However, in the preferred embodiment, bonus head 20 also includes a pair of outer opposed grippers 50, 52 which extend below the gripping surface of the inner opposed grippers 44, 46. The outer opposed grippers 50, 52 are attached to the bonus head assembly by pairs of parallel arms 54, 56 at pivot points 57, 58.

Figure 6:
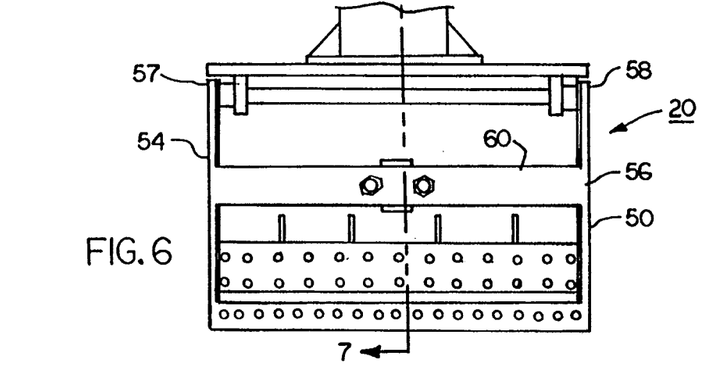
FIG. 6 is an enlarged side view of the bonus head assembly shown in FIG. 2.

As can be seen in FIG. 6, a cross-member 60 is attached between the parallel arms and a gripper bar member 62 extends across the ends of the arms opposite the pivot points.

Figure 7:
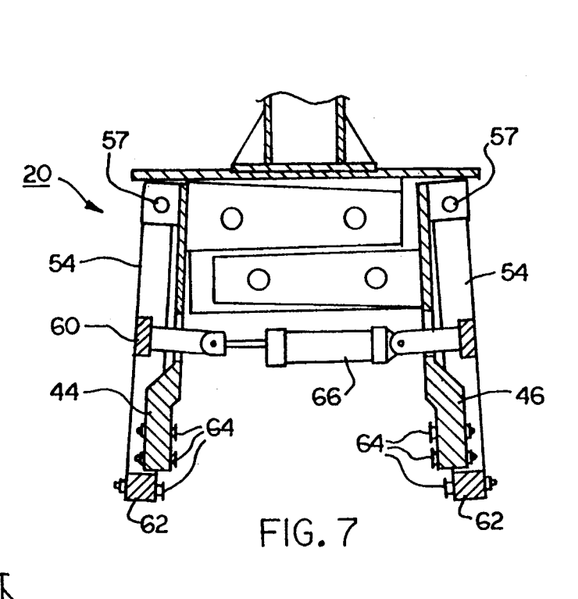
FIG. 7 is an enlarged cross-sectional view of the bonus head assembly shown in FIG. 6 taken along lines 7—7.

Finally, turning to FIG. 7, there is shown an enlarged cross-sectional view of the bonus head assembly shown in FIG. 6 taken along lines 7—7. An actuator 66 is attached between the opposed cross-members 60 attached between each of the pair of parallel arms. In operation, the bonus head assembly constructed according to the present invention can pick up between 1 and 3 courses of brick and selectively set down either the lower course of brick or the lower and upper courses of brick. This ability, allows the bonus head pick-up to pick-up two courses of brick at one time and use one course to form the tyne layer and the other course to form the fourth layer in the final package having three courses of brick. As discussed above, the brick are normally formed into a first three-course high layer having an upper layer forming the tyne course, a second layer having two courses of brick, a third layer having two courses of brick and a fourth layer having three courses of brick. This particular grouping forms a package having ten layers of brick arranged in 5 rows each having 11 brick in each row. Allowing for the 20 brick removed to form the tyne openings, this arrangement forms a standard package size of 530 brick.

Certain modifications and improvements will occur to those skilled in the art upon a reading of the foregoing description. By way of example, a conventional set-down transfer head could be used in place of the bonus head used in the preferred embodiment of the present invention. It should be understood that all such modifications and improvements have been deleted herein for the sake of conciseness and readability but are properly within the scope of the following claims.

We claim:

1. An apparatus for forming a tyne layer in an automatic brick stacking system having a conveyor for moving courses of brick from a kiln car to a stacking and straping station, said apparatus comprising:

(a) a set-down transfer head for removing a course of brick from said conveyor;

(b) a separation conveyor located transversely to said conveyor for receiving brick from said set-down transfer head and conveying the bricks, said separation conveyor having a plurality of parallel, spaced-apart conveying means defining an upper surface for moving the bricks in a longitudinal direction along said upper surface;

(c) stop means attached to said separation conveyor for selectively engaging and stopping the movement of bricks therepast said stop means; and (d) a first lift means disposed between said conveying means and between one end of said separation conveyor and said stop means for lifting and redepositing a portion of the bricks upstream of said stop means, whereby said conveying means, stop means, and first lift means are sequentially operated in a cooperative relationship to space the rows of brick apart in the longitudinal direction of conveyance and at predetermined intervals to form said tyne layer.

2. The apparatus according to claim 1, further including a tyne pick-up head for removing said tyne layer from said separation conveyor.

3. The apparatus according to claim 2, further including a second lift means disposed between said conveying means and between the other end of said separation conveyor and said stop means for lifting a portion of the bricks which have been moved downstream of said stop means opposite from said conveying means.

4. The apparatus according to claim 1, wherein each of said conveying means is a continuous belt conveyor.

5. The apparatus according to claim 4, wherein said continuous belt conveyor is a linked chain-type continuous belt conveyor to prevent slippage between the conveyor belt and drive means of said conveyor.

6. The apparatus according to claim 1, wherein said separation conveyor includes a drive means connected to said conveying means.

7. The apparatus according to claim 6, wherein said drive means is a servo-electric motor.

8. The apparatus according to claim 6, wherein said separation conveyor further includes an encoder means connected to said conveying means for providing a control signal indicative of the position of said conveying means.

9. The apparatus according to claim 8, wherein said separation conveyor further includes a control circuit connected between said encoder means and said drive means for controlling the position of said conveying means.

10. The apparatus according to claim 1, wherein said stop means includes: a frame having a pair of opposed sides attached to said separation conveyor; a first pair of arms attached at one end to each side of said frame; a plate attached to the other end of said first pair of arms and transversely extending across said conveying means; and an actuator for raising and lowering said plate with respect to the upper surface of said conveying means.

11. The apparatus according to claim 10, wherein said stop means further includes a second pair of arms parallel to said first pair of arms for forming a parallelogram, whereby said plate remains substantially perpendicular to the surface of said conveying means as said plate is raised and lowered.

12. The apparatus according to claim 10, wherein said actuator includes an air bag located between said frame and said first pair of arms to raise and lower said stop plate.

13. An apparatus for removing at least two courses of brick and for selectively depositing one course or two courses of brick, said apparatus comprising:
 (a) an overhead frame;
 (b) a first pair of opposed gripping heads attached to said frame along the upper edge of each head, said first pair of heads having a first gripping surface located along the lower edge of each head;
 (c) a second pair of opposed gripping heads pivotally attached to said first pair of opposed gripping heads along the upper edge of each head, said second pair of heads having a second gripping surface located along the lower edge of each head and parallel and adjacent to and below said first gripping surface; and
 (d) a fluid operated cylinder extending between said second pair of opposed gripping heads for providing for independent operation of said second pair of opposed gripping heads.

14. The apparatus according to claim 13, wherein said first and second gripping surface includes an array of multipoint grippers.

15. An apparatus for forming a tyne layer in an automatic brick stacking system having a conveyor for moving courses of brick from a kiln car to a stacking and straping station, said apparatus comprising:
 (a) a set-down transfer head for removing a course of brick from said conveyor, said transfer head including: (i) an overhead frame; (ii) a first pair of opposed gripping heads attached to said frame, said heads having a first gripping surface located along the lower edge of each head; (iii) a second pair of opposed gripping heads pivotally attached to said first pair of opposed gripping heads, said heads having a second gripping surface located along the lower edge of each head and parallel and adjacent to and below said first gripping surface; and (iv) a fluid operated cylinder extending between said second pair of opposed gripping heads for providing independent operation of said second pair of opposed gripping heads;
 (b) a separation conveyor located transversely to said conveyor for receiving brick from said set-down transfer head and conveying the bricks, said separation conveyor having a plurality of parallel, spaced-apart conveying means defining an upper surface for moving the bricks in a longitudinal direction along said upper surface;
 (c) stop means attached to said separation conveyor for selectively engaging and stopping the movement of bricks therepast said stop means;
 (d) a first lift means disposed between said conveying means and between one end of said separation conveyor and said stop means for lifting and redepositing a portion of the bricks upstream of said stop means, whereby said conveying means, stop means, and first lift means are sequentially operated in a cooperative relationship to space the rows of brick apart in the longitudinal direction of conveyance and at predetermined intervals to form said tyne layer; and
 (e) a tyne pick-up head for removing said tyne layer from said separation conveyor.

16. The apparatus according to claim 15, further including a second lift means disposed between said conveying means and between the other end of said separation conveyor and said stop means for lifting a portion of the bricks downstream of said stop means opposite from said conveying means.

17. The apparatus according to claim 15, wherein each of said conveying means is a continuous belt conveyor.

18. The apparatus according to claim 17, wherein said continuous belt conveyor is a linked chain-type continuous belt conveyor to prevent slippage between the conveyor belt and drive means of said conveyor.

19. The apparatus according to claim 15, wherein said separation conveyor includes a drive means connected to said conveying means.

20. The apparatus according to claim 19, wherein said drive means is a servo-electric motor.

21. The apparatus according to claim 19, wherein said separation conveyor further includes an encoder means connected to said conveying means for providing a control signal indicative of the position of said conveying means.

22. The apparatus according to claim 21, wherein said separation conveyor further includes a control circuit connected between said encoder means and said drive means for controlling the position of said conveying means.

23. The apparatus according to claim 15, wherein said stop means includes: a frame having a pair of opposed sides attached to said separation conveyor; a first pair of arms attached at one end to each side of said frame; a plate attached to the other end of said first pair of arms and transversely extending across said conveying means; and an actuator for raising and lowering said plate with respect to the upper surface of said conveying means.

24. The apparatus according to claim 23, wherein said stop means further includes a second pair of arms parallel to said first pair of arms for forming a parallelogram, whereby said plate remains substantially perpendicular to the surface of said conveying means as said plate is raised and lowered.

25. The apparatus according to claim 23, wherein said actuator includes an air bag located between said frame and said first pair of arms to raise and lower said stop plate.

26. The apparatus according to claim 15, wherein said first and second gripping surface includes an array of multipoint grippers.

* * * * *